(12) United States Patent
Sartore

(10) Patent No.: US 6,854,629 B1
(45) Date of Patent: Feb. 15, 2005

(54) SUPPORT STRUCTURE FOR BICYCLE BOTTLES AND SIMILAR CONTAINERS

(76) Inventor: Almerigo Sartore, Via Velo, 47, 15014 Fontaniva (Vincenza) (IT)

( * ) Notice: Subject to any disclaimer, the term of this patent is extended or adjusted under 35 U.S.C. 154(b) by 0 days.

(21) Appl. No.: 09/830,773
(22) PCT Filed: Aug. 29, 2000
(86) PCT No.: PCT/IB00/01197
§ 371 (c)(1), (2), (4) Date: May 1, 2001
(87) PCT Pub. No.: WO01/17845
PCT Pub. Date: Mar. 15, 2001

(30) Foreign Application Priority Data

Sep. 3, 1999 (IT) .......................................... VI990073 U

(51) Int. Cl.[7] ............................................... B62J 11/00
(52) U.S. Cl. ..................... 224/414; 248/311.2; 220/737
(58) Field of Search ................................. 224/414, 412, 224/413, 415, 428; 248/311.2; 220/737, 743

(56) References Cited

U.S. PATENT DOCUMENTS

| | | | | |
|---|---|---|---|---|
| 378,361 A | * | 2/1888 | Fox .......................... | 248/311.2 |
| 1,419,488 A | * | 6/1922 | Call .......................... | 248/311.2 |
| 4,009,810 A | | 3/1977 | Shook | |
| 4,640,449 A | * | 2/1987 | Blackburn ................... | 224/414 |
| 4,830,240 A | * | 5/1989 | Tackles et al. .............. | 224/414 |
| 5,060,832 A | * | 10/1991 | Link .......................... | 224/414 |
| 5,145,138 A | * | 9/1992 | Schlanger et al. ........... | 224/414 |
| 5,513,885 A | * | 5/1996 | Joffe .......................... | 215/396 |
| 6,193,202 B1 | * | 2/2001 | Rogers ........................ | 248/106 |
| 6,216,929 B1 | * | 4/2001 | Bonard et al. .............. | 224/414 |
| D455,707 S | * | 4/2002 | Sartore ....................... | D12/114 |

FOREIGN PATENT DOCUMENTS

| | | |
|---|---|---|
| EP | 0 523 379 A | 1/1993 |
| FR | 2 615 158 A | 11/1988 |

* cited by examiner

Primary Examiner—Lien Ngo

(57) ABSTRACT

A support structure for bicycle bottles includes a three-dimensional supporting cage frame (2) and anchoring structure (6, 7) for securing to a bicycle frame. The supporting structure (2) has a rear post (3) with two arms (4, 5) extending from its upper end, the arms being substantially symmetrical and diverging from each other. The arms (4, 5) are at least partially bent upwardly, forwardly and downwardly in order to embrace the lateral wall of a bottle (B), the lower end portions (8, 9) of the arms converge and are connected to each other to form a lower appendix (10) directed towards the post (3) that is suitable to support the bottom wall of the bottle (B). The arms (4, 5) and the post (3) are positioned over a substantially cylindrical surface whose inner diameter (D) is slightly larger than the outer diameter (Ø) of the bottle (B). The maximum span (d) between the inner edges of the converging lower ends (8, 9) of the arms is smaller than or equal to the half of the inner diameter (D) at a distance (h) from the appendix (10) that is substantially equal to the inner diameter (D). The support structure exhibits a reduced weight, an improved drag efficiency, a larger file of the bicycle bottle.

13 Claims, 6 Drawing Sheets

SUPPORT STRUCTURE FOR BICYCLE BOTTLES AND SIMILAR CONTAINERS

FIELD OF THE INVENTION

The present invention relates to a support structure for bicycle bottles suitable for practising sports and leisure, o for similar containers, of the type comprising a cage-like or three dimensional supporting frame, as well as anchoring means for attaching to a bicycle frame or to a similar member.

BACKGROUND OF THE INVENTION

Supports of the above mentioned type are known in the art, wherein the supporting frame is formed by a wire wound and bent in different ways, and so shaped as to house a bicycle bottle. An example of said known conventional supports is disclosed in the Italian application for utility model application No. V193U000020 filed by the same applicant.

Several drawbacks and shortcomings of said known types of supports are to be found in their excessive cost and weight, in their limited gripping action on the bottle, in their remarkable cross sectional encumbrance and in their insufficient aerodynamic efficiency.

SUMMARY OF THE INVENTION

The support structure according to the present invention aims at overcoming the above mentioned drawbacks, by providing a support structure for bicycle bottles and similar containers that features a remarkable cost-effectiveness, enhanced mechanical gripping action on the bottle, and further a reduced encumbrance and a suitably enhanced aerodynamic efficiency.

The above aim is accomplished by a support of the above outlined type which is characterized in that said supporting frame comprises a rear anchoring post with an upper end, two arms extending from the upper end and being substantially symmetrical and diverging from each other, said arms further being at least partially bent upwardly, forwardly, and downwardly so as to embrace the lateral wall of a bicycle bottle, the lower ends of said arms converging and being reciprocally joined so as to form a lower appendix directed towards said post, said appendix being suitable for supporting the bottom wall of said bicycle bottle.

Advantageously the arms and the post of said supporting frame are located over a substantially cylindrical surface having an inner diameter that is slightly larger than that of the bicycle bottle or container to be supported.

A main feature of the present invention is that the minimum distance between the inner edges of the lower converging ends of said arms is substantially equal or smaller than the half of said inner diameter at a distance from said appendix that is equal or smaller than said inner diameter. Thanks to this relationship, the supporting structure guarantees an excellent gripping action on the bicycle bottle even in heavy situations.

Advantageously, the inner diameter of the cylindrical surface is sized so as to be capable of supporting cycling bottles having a diameter that is shorter that the standard lengths, so as to reduce the encumbering width of the supporting frame and to increase its aerodynamic efficiency.

BRIEF DESCRIPTION OF THE DRAWINGS

Further features and advantages will be more apparent from the detailed description of several preferred embodiments of the support structure according to the present invention, illustrated by way of not limiting examples with reference to the annexed tables of drawings, wherein:

FIG. 5 is a lateral view of the support structure of FIG. 4, sectioned along a diametral sectional plane;

FIG. 9 is a lateral view of the support structure of FIG. 8 sectioned along a diametral vertical plane;

DESCRIPTION OF A PREFERRED FORM OF EMBODIMENT

Figure 19:
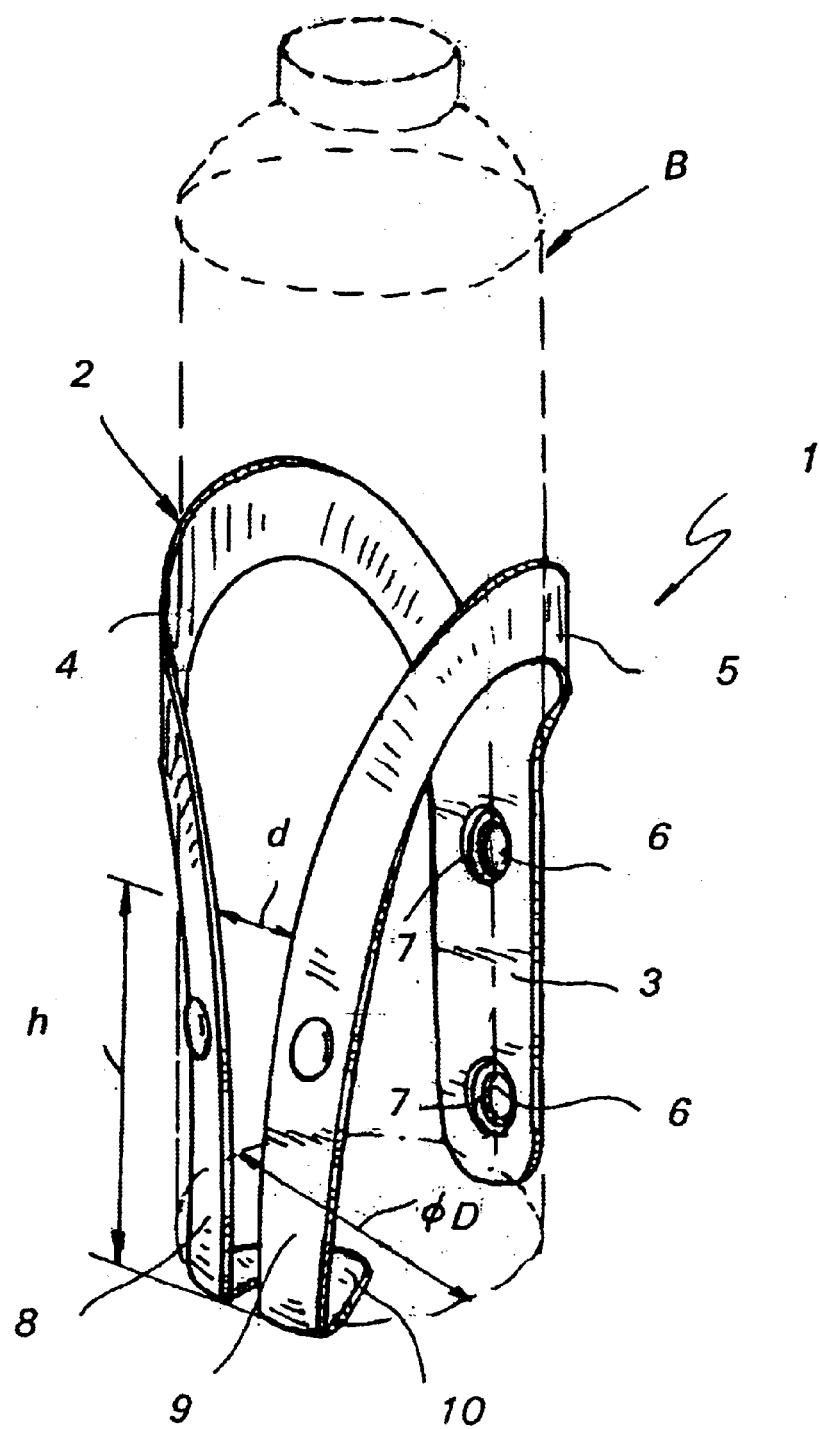
FIG. 19 is a general perspective view of a support structure for bicycle bottles of the present invention in its operating condition.

With reference to the figures, a support structure for bicycle bottles and similar containers, overall indicated with the reference numeral 1, comprises a supporting frame 2 made of a relatively rigid material, suitable to house and removably hold internally thereof a bottle B schematically depicted in FIG. 19 with dotted lines.

According to the invention, the supporting frame 2 essentially comprises a back anchoring post 3 extending along a longitudinal axis L, with two supporting arms 4, 5 extending from the upper end of post 3.

Preferably, post 3 has a substantially "U" shaped section (FIG. 3) and is provided with means for anchoring to a bicycle frame or a similar member. In this particular case, said anchoring means consist of two holes 6 formed in corresponding recesses 7 for screw heads.

Arms 4, 5 are symmetrical and diverging from the longitudinal axis L, and they are bent along a curved space line first upwardly, then forwardly and eventually downwardly in order to embrace the lateral wall of bottle B.

Suitably, the lower ends 8, 9 of arms 4,5 converge and are reciprocally joined so as to form a substantially "V" or "U" shaped lower appendix 10 directed towards post 3 and adapted to support the bottom wall of bottle B.

Suitably, the post 3 and the arms 4, 5 are located along a substantially cylindrical surface having an inner diameter D that is slightly larger than diameter Ø of bottle B.

The lower ends 8, 9 of arms 4, 5 are formed so as to be capable of holding bottle B in a stable and reliable manner in every operating conditions, thereby avoiding any accidental removal thereof from the space between the inside edges of arms 4, 5.

To this end, at a predetermined distance h from appendix 10, the span d between the inside edges of lower converging edges 8, 9 of arms 4, 5 has a predetermined maximum value.

In particular, at a distance h which equals to the value D of the inner diameter of the supporting frame 2, the span d is smaller than or equal to the value of said inner diameter D.

Such a condition may be summarised as follows:

for h=D=d⇒d=D/2

Preferably, the width of arms 4, 5 in correspondence of their curved upper areas is slightly smaller than half the length of the inner diameter, more specifically it is approximately equal to D/2.2.

The inner diameter D is sized so as to house bottles having an outer diameter Ø smaller than their standard sizes, so as to reduce the encumbering width of the supporting frame, thus remarkably reducing the transversal encumbrance and the aerodynamic drag, and optimising the aerodynamic efficiency of the bottle support. By way of example, the diameter D may range between 40 mm. and 50 mm., and may preferably be 45 mm long.

Preferably, the post 3 and the arms 4, 5 are unitarily formed and have a plate configuration with a plane cross-section so as to define a supporting frame 2 of a continuous and monolithic type, that can be obtained by moulding or injection moulding.

For example, monolithic structure 2 may be produced starting from a metal plate or from a multi-sandwich type plastic sheet.

The supporting structure 2 may be provided with one or more lightening holes 11, 12 or with slits shaped as a writing or a symbol positioned peripherally of the frame and along arms 4, 5.

In general, the supporting structure 2 may be provided with the bottle gripping means located along arms 4, 5.

Figure 1:
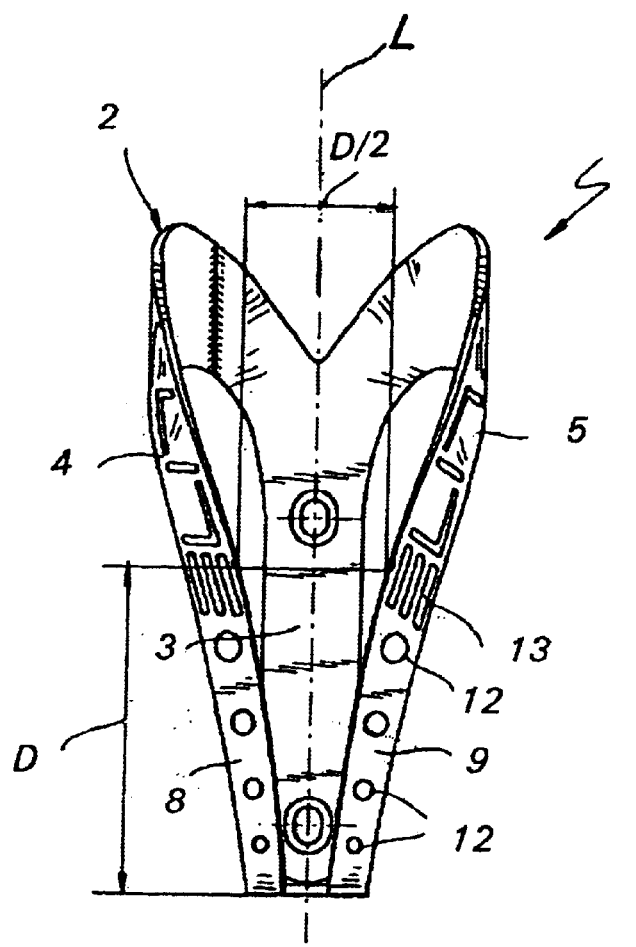
FIG. 1 represents a front view of a first embodiment of the support structure without gripping means for a bottle.
Figure 2:
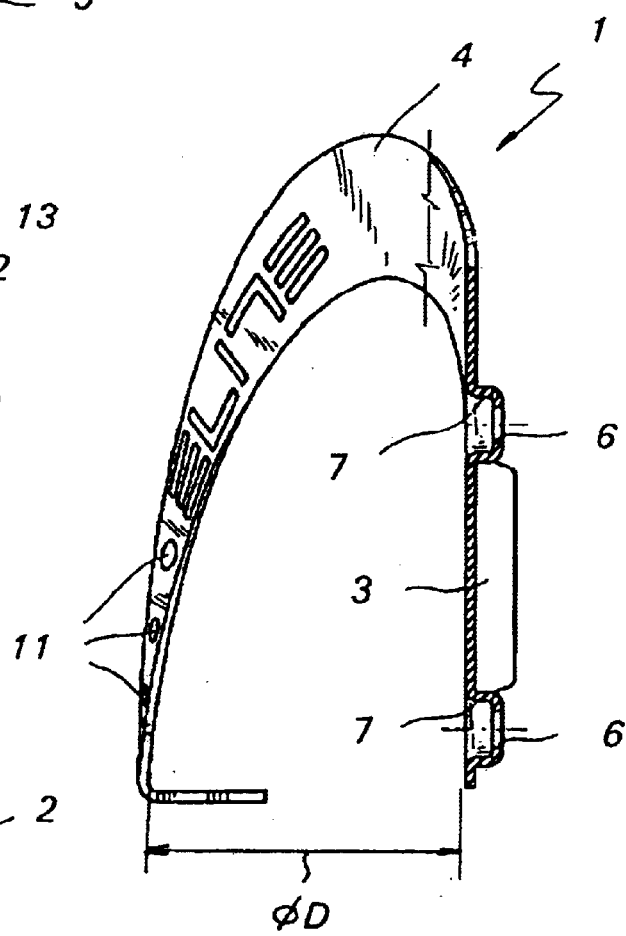
FIG. 2 represents a lateral view of the support structure of FIG. 1, sectioned along a diametral vertical plane.
Figure 3:
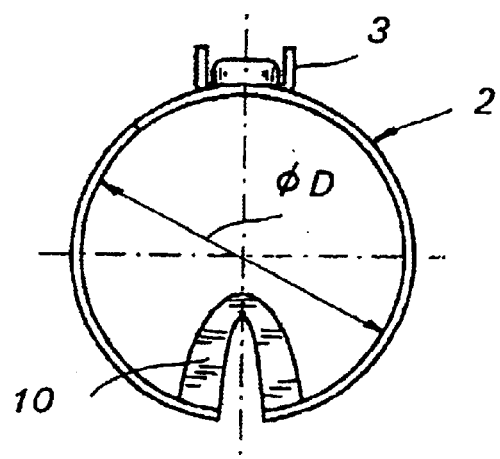
FIG. 3 is a plan view from above of the support structure of FIG. 1.
Figure 4:
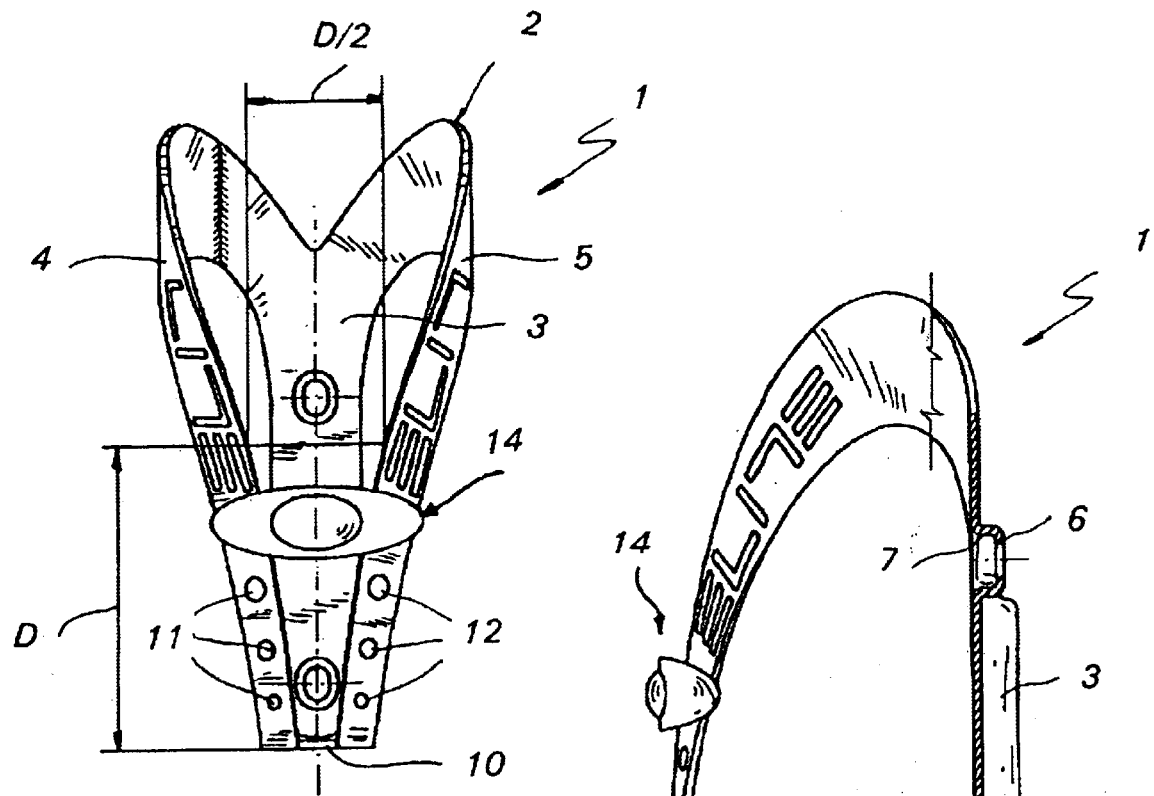
FIG. 4 is a front view of a second embodiment of support structure according to the present invention.
Figure 6:
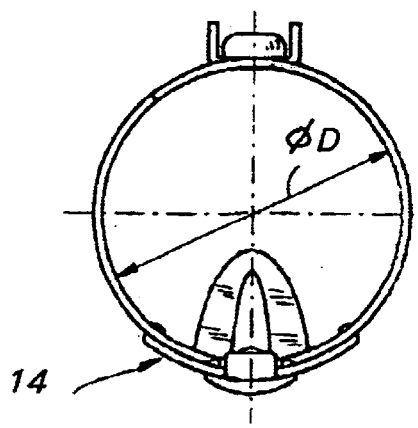
FIG. 6 is a plan view from above of the support structure of FIG. 4.
Figure 7:
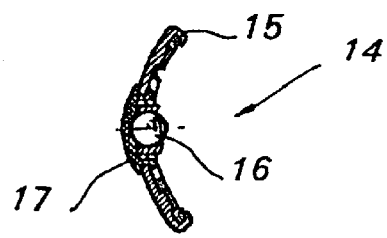
FIG. 7 is a sectional view in greater scale of a detail of FIG. 4.
Figure 8:
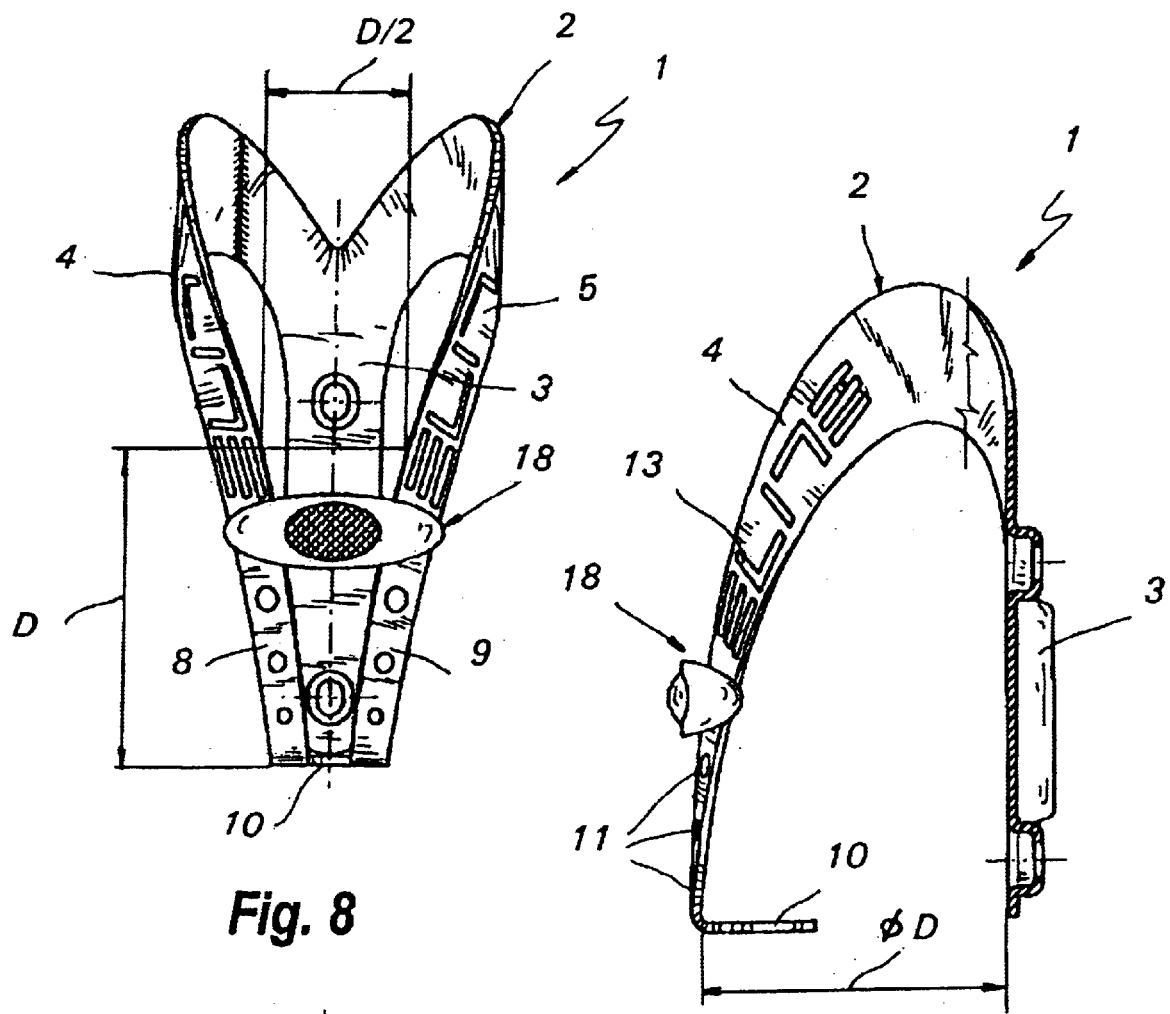
FIG. 8 is a front view of a third embodiment of support structure according to the present invention.
Figure 10:
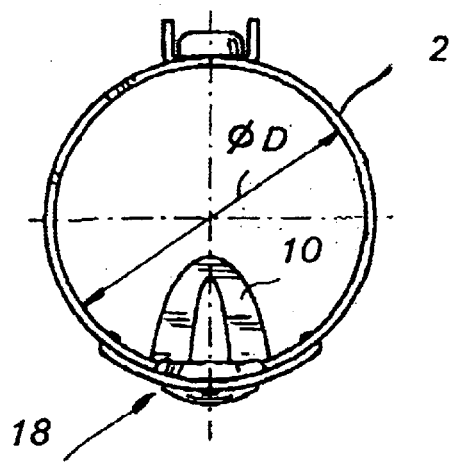
FIG. 10 is a plan view from above of the support structure of FIG. 8.
Figure 11:
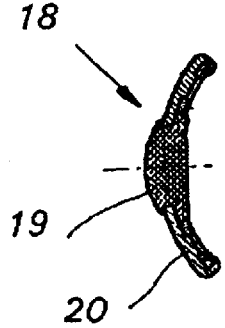
FIG. 11 is a sectional view in greater scale of a detail of FIG. 8.
Figure 12:
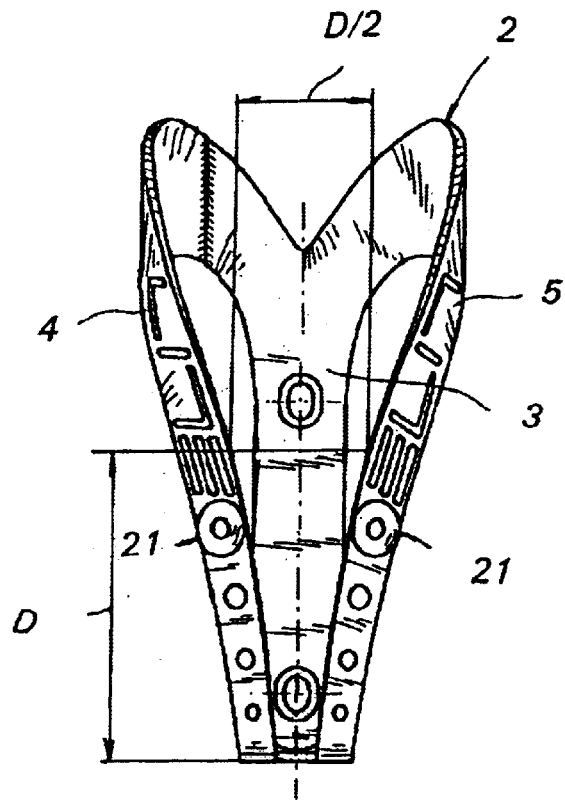
FIG. 12 is a front view of a fourth embodiment of support structure according to the present invention.
Figure 13:
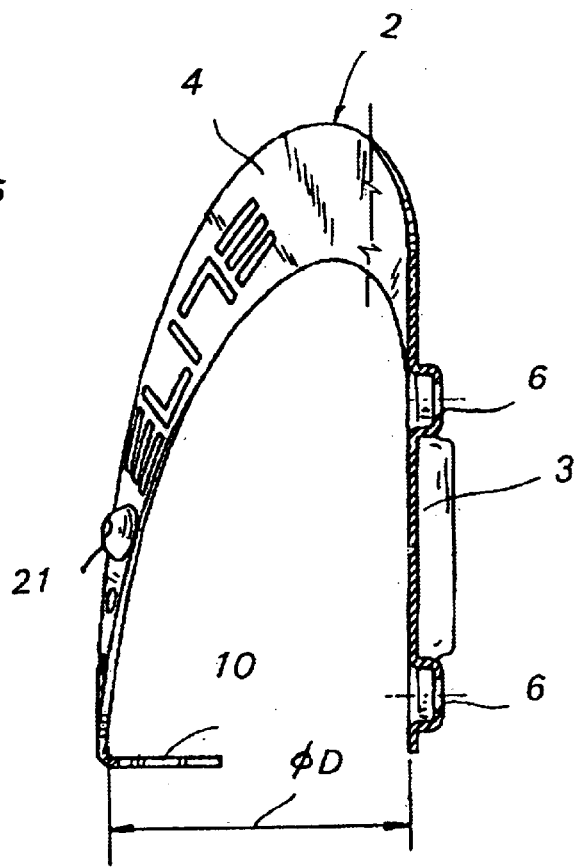
FIG. 13 is a lateral view of the support structure of FIG. 12, sectioned along a vertical diametral plane.
Figure 14:
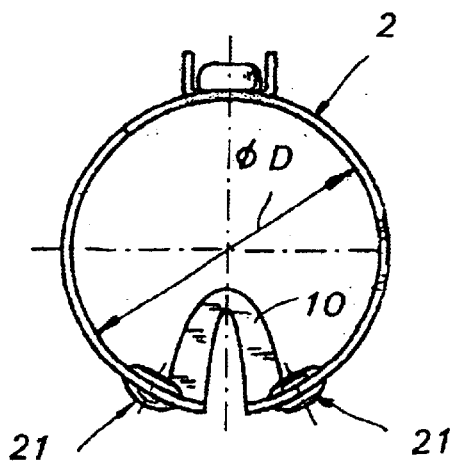
FIG. 14 is a plan view from above of the support structure of FIG. 12.
Figure 15:
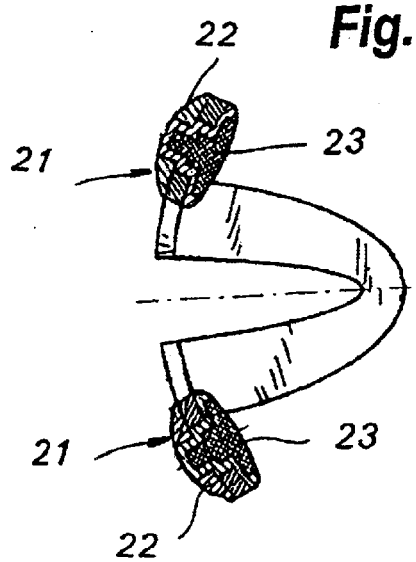
FIG. 15 is a sectional view in greater scale of a detail of FIG. 14.

In the embodiment shown in FIGS. 1 to 3, no gripping means are provided, because such function is uniquely exerted by the plastic material forming the supporting frame 2.

The embodiment shown in FIGS. 4 to 7 differs from the previous one only in that the gripping means consist of a centrally located pad 14 formed by an ellipsoidal shaped plate 15 made of a relatively rigid material that is anchored to portions 8, 9 of arms 4, 5, the pad 14 centrally supports a ball 16 resiliently held by a boss 17 made of a resiliently flexible material, rubber or plastics for example. Thus, bottle B will be resiliently clamped by the ball 16 against the elastic biasing action of boss 17.

The embodiment shown in FIGS. 8 to 11 differs from the previous one only in that the gripping means consist of a resilient pad 18 made of a boss 19 of resiliently flexible material, held by an ellipsoidally shaped connecting plate 20.

The resiliently flexible material forming the boss may be chosen among the group including gels, rubbers or plastic materials.

The embodiment shown in FIGS. 12 to 15 differs from the previous one only in that the gripping means for the bottle B consist of a pair of substantially identical supports 21, each formed by a metal or plastic shell 22 which can be inserted into corresponding seats of portions 8, 9 of arms 4, 5, each shell housing internally thereof a pad 23 made of gel, rubber or formed by a small air chamber.

Figure 16:
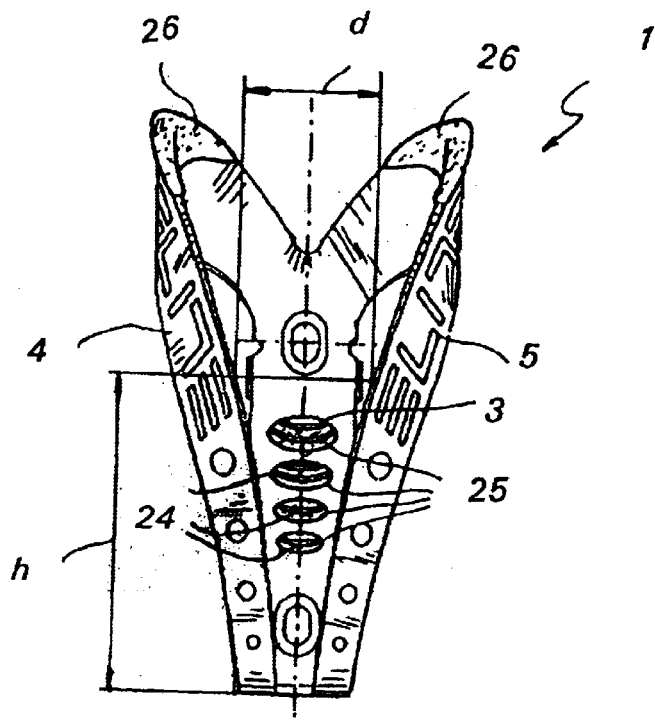
FIG. 16 is a front view of a fifth support structure according to the present invention.
Figure 17:
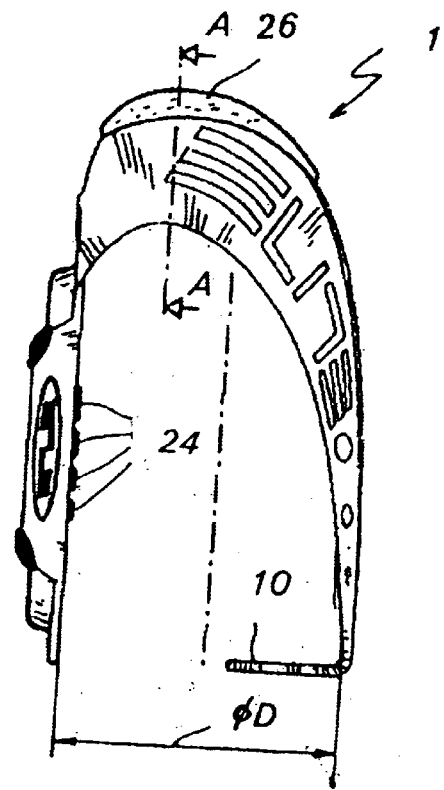
FIG. 17 is a lateral view of the support structure of FIG. 16.
Figure 18:
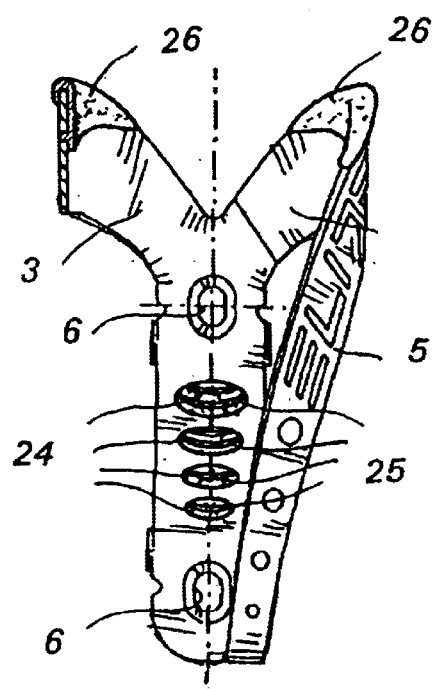
FIG. 18 is a lateral view of the support of FIG. 16 sectioned along a vertical diametral plane.

The embodiment shown in FIGS. 16 to 18 differs from the previous ones essentially in that the gripping means for bottle B consist of a series of small elliptical rubber or plastic pads 24 formed on post 3 and provided with one or more transverse chevron groves 25, permitting the downward insertion of the bottle into the support frame while preventing upward easy removal thereof. The gripping means further comprise two rubber of plastic lips 26 inserted on to the upper edges of arms 4, 5 to further increase the gripping action on bottle B.

According to the foregoing description, it is clear that the support accomplishes its aims and particularly entails reduced weight, limited encumbrance reduced aerodynamic drag, and higher reliability in terms of capability to firmly hold the bottle.

The instant application is based upon Italian patent application V199U000073, filed on 3 Sep. 1999, the disclosure of which is hereby expressly incorporated by reference thereto, and the priority of which is hereby claimed.

What is claimed is:

1. A support structure for bicycle bottles, comprising a unitary supporting three dimensional cage frame, anchoring means for attachment thereof to a bicycle frame, said supporting frame comprising a rear anchoring post, said rear anchoring post having an upper end and a lower end, said rear anchoring post extending exclusively and continuously between said upper end thereof and said lower end thereof in a direction which is parallel to a longitudinal axis of said supporting frame extending upwardly and downwardly, said supporting frame further comprising two substantially symmetrical and diverging arms which each extend from said upper end of said rear anchoring post so as to embrace the lateral wall of a bottle, said arms having lower ends converging and being reciprocally joined so as to form a lower appendix directed towards said post and adapted to support the bottom wall of the bottle said arms and said post being located along a substantially cylindrical surface having an inner diameter that is slightly larger than the diameter of the bottle to be supported, said arms each comprising a first portion extending upwardly and forwardly from said upper end of said rear anchoring post, said first portion having a first end which is monolithically formed with said upper end of said rear anchoring post, and said first portion having a second end, said first portion extending exclusively and continuously from said first end thereof to said second end thereof, said first portion extending upwardly and forwardly from said first end thereof to said second end thereof, and said arms each comprising a second portion extending downwardly and forwardly from said first portion, said second portion having an upper end which is monolithically formed with said second end of said first portion, and said second portion having said lower end of said arms, said second portion extending exclusively and continuously from said upper end thereof to said lower end thereof, said second portion extending downwardly and forwardly from said upper end thereof to said lower end thereof at which said lower apex is monolithically formed.

2. A support structure for bicycle bottles, comprising a urinary supporting three dimensional cage frame, anchoring means for attachment thereof to a bicycle frame, said supporting frame comprising a rear anchoring post with an upper end from which two substantially symmetrical and diverting arms extend so as to embrace the lateral wall of a bottle, the lower ends of said arms converging and being reciprocally joined so as to form a lower appendix directed towards said post and adapted to support the bottom of the bottle, said arms and said post being located along a substantially cylindrical surface having an inner diameter that is slightly larger than the diameter of the bottle to be supported, said arms comprising a first portion directed upwardly and forwardly from said upper end of said rear anchoring post, and a second portion directed downwardly and forwardly from said first portion, said lower converging ends having inside edges and a span between the inside edges of said lower converging ends, said span having, at a distance from said appendix that is substantially equal to said inner diameter, a maximum value which is smaller than or equal to one half of said inner diameter.

3. Support structure according to claim 1, wherein said inner diameter has a predetermined size ranging between 40 mm and 50 mm and preferably equal to approximately 45 mm so as to be smaller than those or traditional bicycle support structures and to reduce the transversal encumbrance or the supporting frame.

4. Support structure according to claim 1, wherein said arms and said post are unitarily formed and in that they have a substantially plate configuration with plane cross-section so as to define a monolithic supporting frame.

5. Support structure according to claim 1, wherein said supporting frame is formed starting from a metal plate or from a plastic sheet.

6. Support for bottle according to claim 1, wherein said supporting frame is provided with one or more lightening holes peripherally located along said arms.

7. Support structure according to claim 1, wherein said supporting frame is provided with means for gripping the bottle located along said arms.

8. Support structure according to claim 7, wherein said gripping means comprise at least a resilient pad.

9. Support structure according to claim 8, wherein said gripping means comprise at least one of a plate and a shell made of a relatively rigid material that houses internally thereof a pad made of a resiliently flexible material.

10. Support structure according to claim 8, wherein said resiliently flexible pad comprises a rigid spherical member held in place by a boss made of a resiliently flexible material.

11. Support structure according to claim 8, wherein said resiliently flexible material is chosen in the group comprising gels, rubbers, or plastic materials.

12. Support structure according to claim 7, wherein said gripping means comprises at least a pad of rubber or plastic material located along said post.

13. Support structure according to claim 11, wherein said gripping means further comprises at least one rubber or plastics lips fitted onto the upper edges of said arms to further hold the bottle upon location thereof into said supporting frame.

* * * * *